Figure 1:
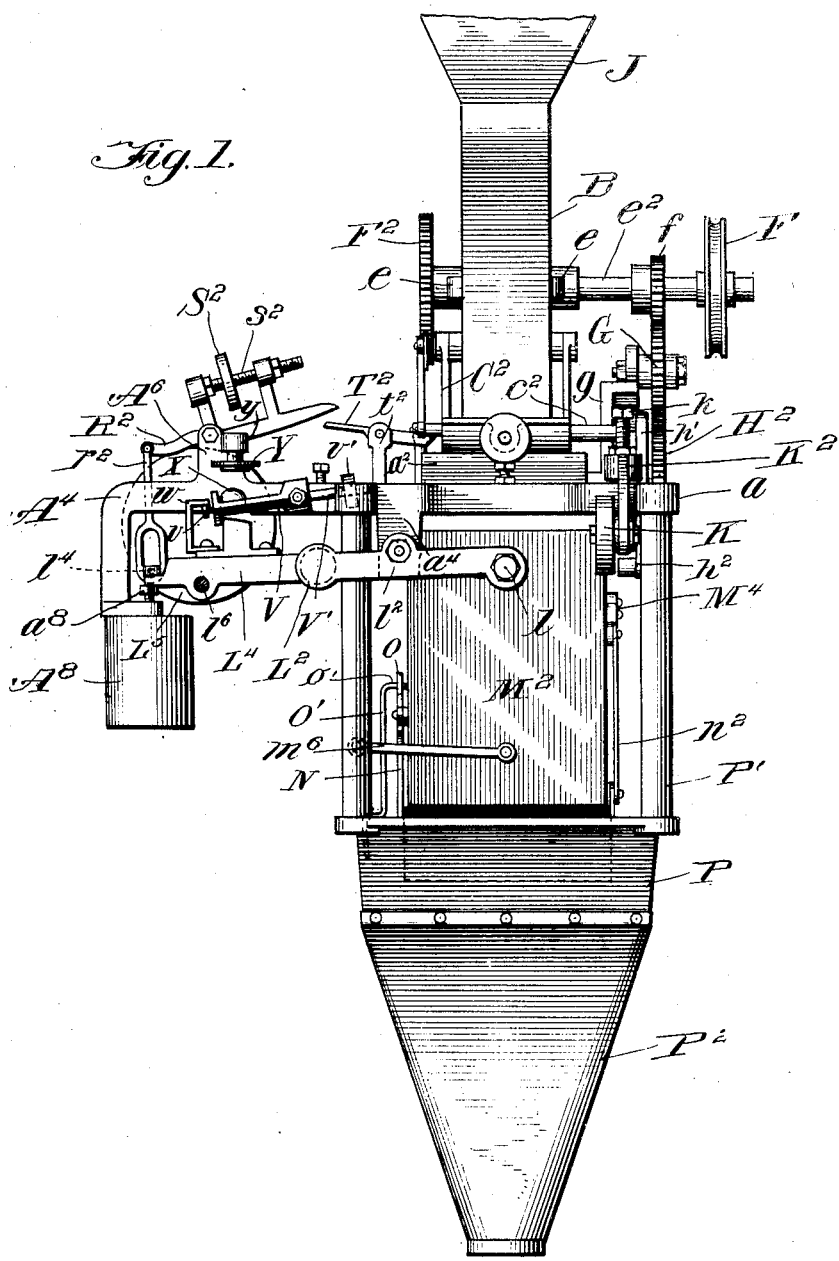

No. 842,664. PATENTED JAN. 29, 1907.
G. HOEPNER.
POWER DRIVEN WEIGHING MACHINE.
APPLICATION FILED JAN. 7, 1904.

5 SHEETS—SHEET 1.

No. 842,664. PATENTED JAN. 29, 1907.
G. HOEPNER.
POWER DRIVEN WEIGHING MACHINE.
APPLICATION FILED JAN. 7, 1904.

5 SHEETS—SHEET 2.

Witnesses:
H. S. Gaither.
C. C. Cunningham.

Inventor:
George Hoepner
by Chamberlin & Wilkinson
Attorneys

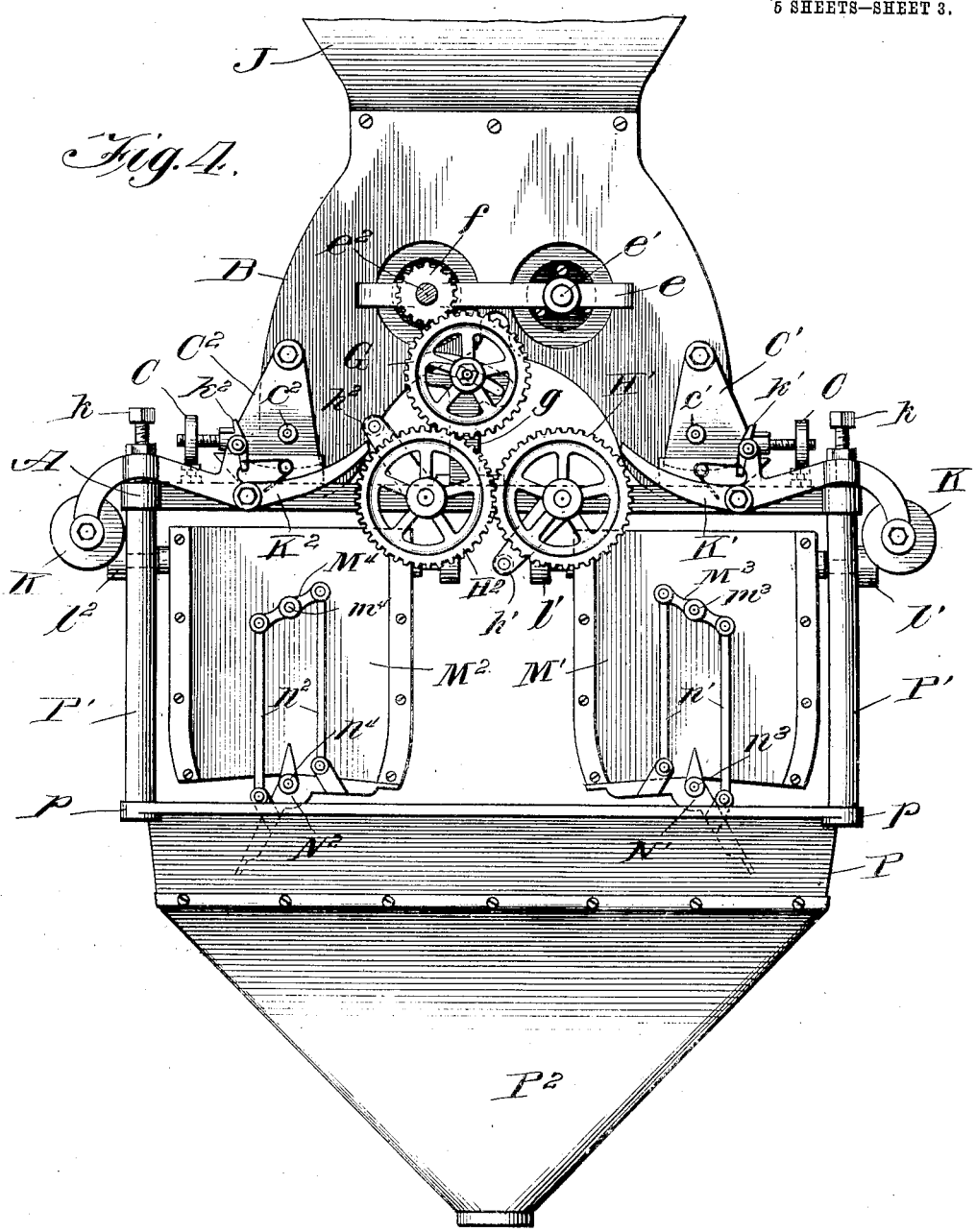

No. 842,664. PATENTED JAN. 29, 1907.
G. HOEPNER.
POWER DRIVEN WEIGHING MACHINE.
APPLICATION FILED JAN. 7, 1904.
5 SHEETS—SHEET 4.
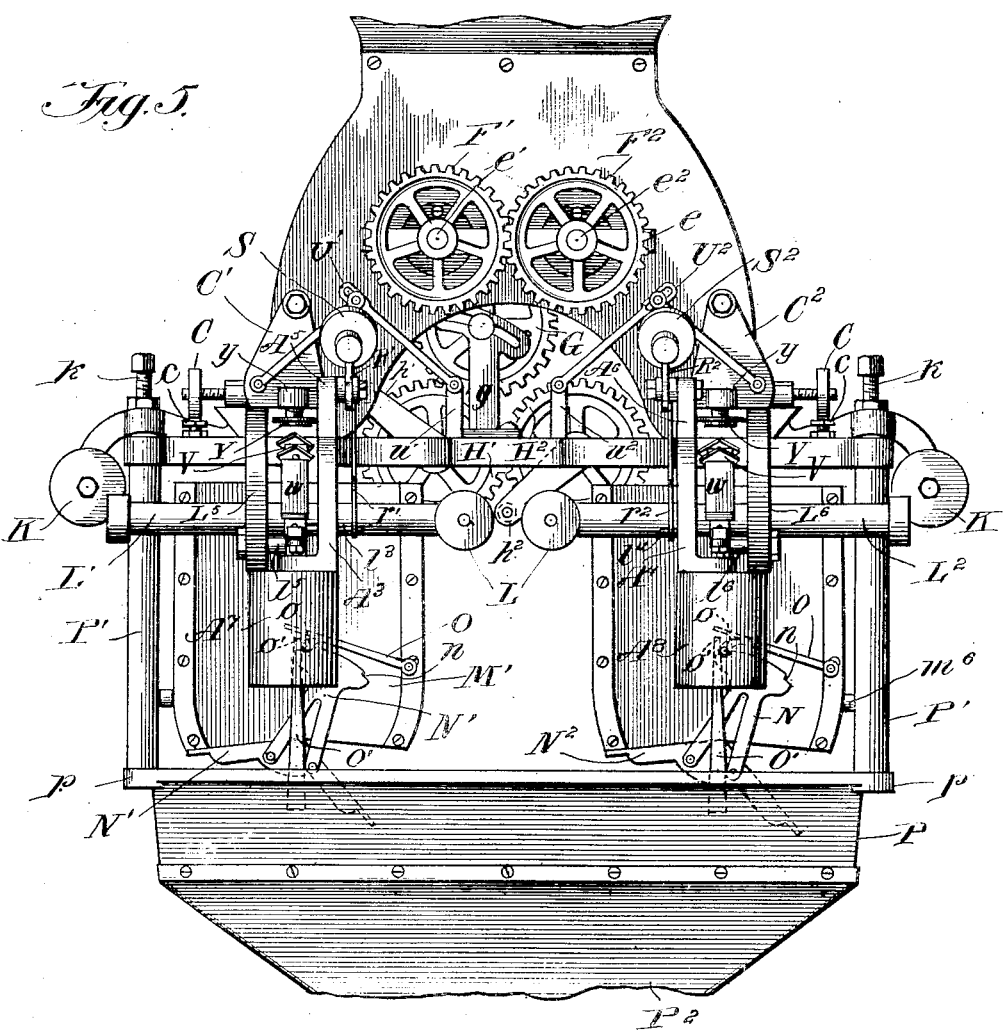
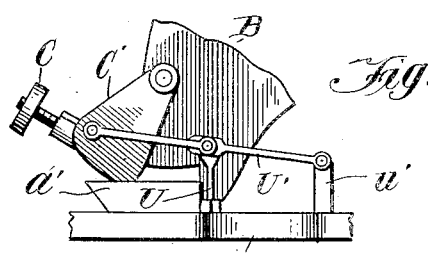
Witnesses:
H. S. Gaither
C. C. Cunningham
Inventor:
George Hoepner
By Chamberlin Wilkinson
Attorneys No. 842,664. PATENTED JAN. 29, 1907.
G. HOEPNER.
POWER DRIVEN WEIGHING MACHINE.
APPLICATION FILED JAN. 7, 1904.
5 SHEETS—SHEET 5.
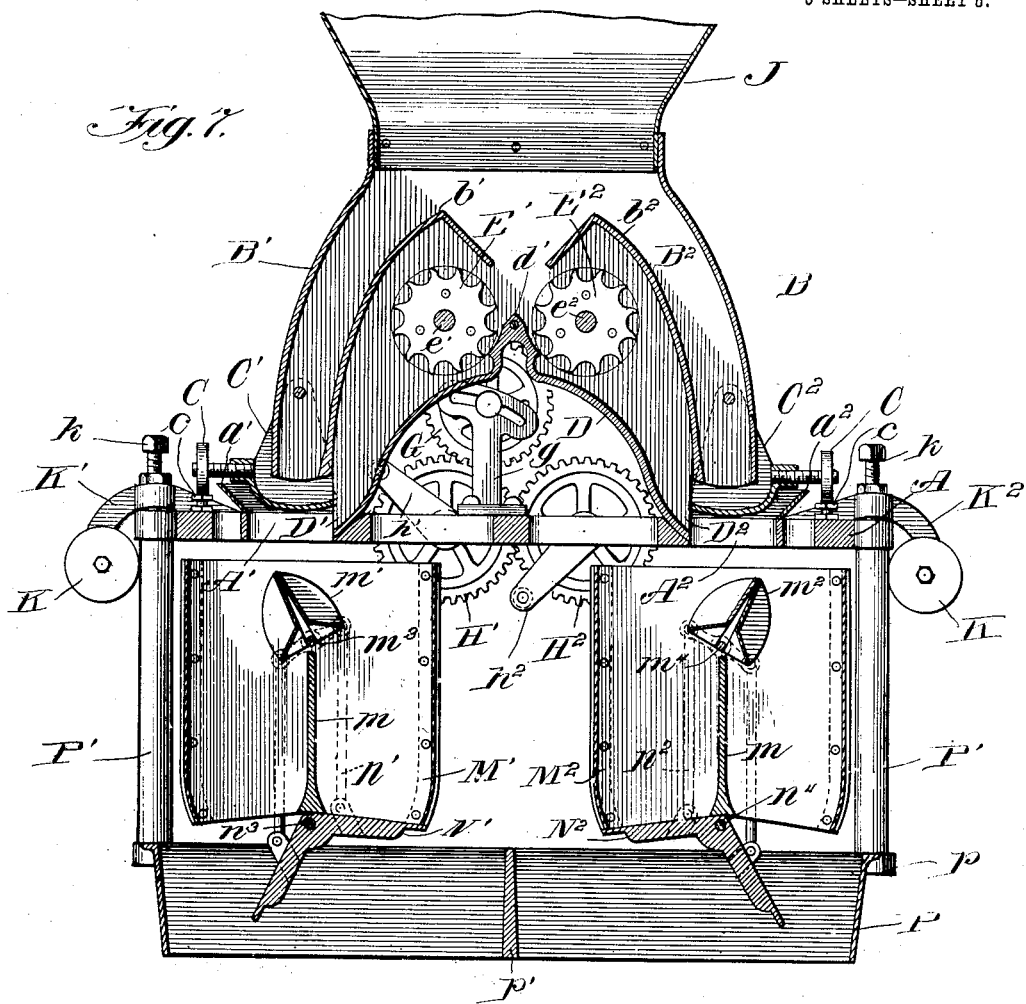
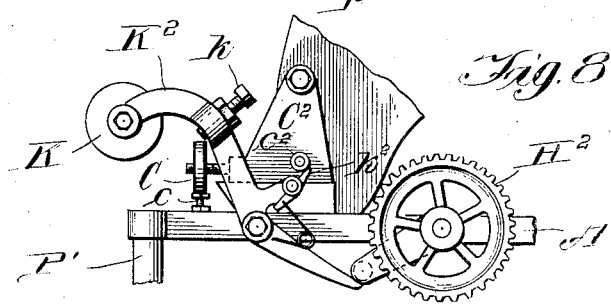

UNITED STATES PATENT OFFICE.

GEORGE HOEPNER, OF CHICAGO, ILLINOIS, ASSIGNOR TO UNION SCALE & MFG. CO., OF SAN FRANCISCO, CALIFORNIA, A CORPORATION OF CALIFORNIA.

POWER-DRIVEN WEIGHING-MACHINE.

No. 842,664.      Specification of Letters Patent.      Patented Jan. 29, 1907.

Application filed January 7, 1904. Serial No. 188,044.

*To all whom it may concern:*

Be it known that I, GEORGE HOEPNER, a citizen of the United States, residing at Chicago, county of Cook, State of Illinois, have invented a certain new and useful Improvement in Power-Driven Weighing-Machines; and I declare the following to be a full, clear, and exact description of the same, such as will enable others skilled in the art to which it pertains to make and use the same, reference being had to the accompanying drawings, which form a part of this specification.

My invention relates in general to weighing-machines, and more particularly to power-controlled automatic weighing-machines.

In automatic weighing-machines as constructed prior to this invention the rapidity of operation is controlled by the successive predetermined amounts of material which are weighed or measured. As in such machines the material is delivered to the weighing-receptacles by gravity, the rapidity of operation depends upon the condition of material, which if dry will readily flow by gravity, and thereby increase the rapidity of operation of the machine, but which if moist will flow more slowly and decrease the rapidity of action of the machine.

The primary object of my invention is to provide a weighing-machine in which the speed of operation will be rendered positive by controlling the supply of material to the weighing-receptacles by power-driven mechanism, thereby eliminating the uncertainty in operation due to the supply of the material being controlled by the weighing or measuring of the material itself.

A further object of my invention is to produce a weighing-machine in which the main supply to the weighing-receptacle will be instantly completely opened and cut off by tripping-weights previously lifted into operative position to be tripped by power.

A further object of my invention is to provide a weighing-machine in which the material will be delivered successively to weighing-receptacles by an intermittently-opening primary or main supply and by a constant secondary or completing supply.

A still further object of my invention is to provide a weighing-machine in which the material to be weighed will be supplied from a common source successively to a plurality of weighing-receptacles, each receptacle comprising two compartments, into which the material is alternately delivered.

My invention has for its final object the provision of a power-controlled automatic weighing-machine which will be comparatively simple in construction, rapid and accurate in action, and efficient in operation.

My invention, generally described, consists in a plurality of weighing-receptacles each having two compartments, a separate scale-beam supporting each receptacle, a main supply leading to each receptacle, a gate controlling each main supply, power-actuated means for alternately tripping weights to open said gates, means actuated by the partial lowering of the receptacles to close the respective gates, a constant power-driven secondary or completing supply leading to each receptacle, means actuated by the complete lowering of each receptacle for discharging the weighed material from one compartment thereof and simultaneously guiding the material into the other compartment, and means for varying the proportions of material delivered by the main and completing supplies according to the rapidity of opening the gates controlling the main supply, so that after closing each gate the necessary quantity of material to complete the predetermined amount may be delivered by the secondary supply before the gate is again opened.

My invention will be more fully described hereinafter with reference to the accompanying drawings, in which the same is illustrated as embodied in a convenient and practical form, and in which—

Figure 2:
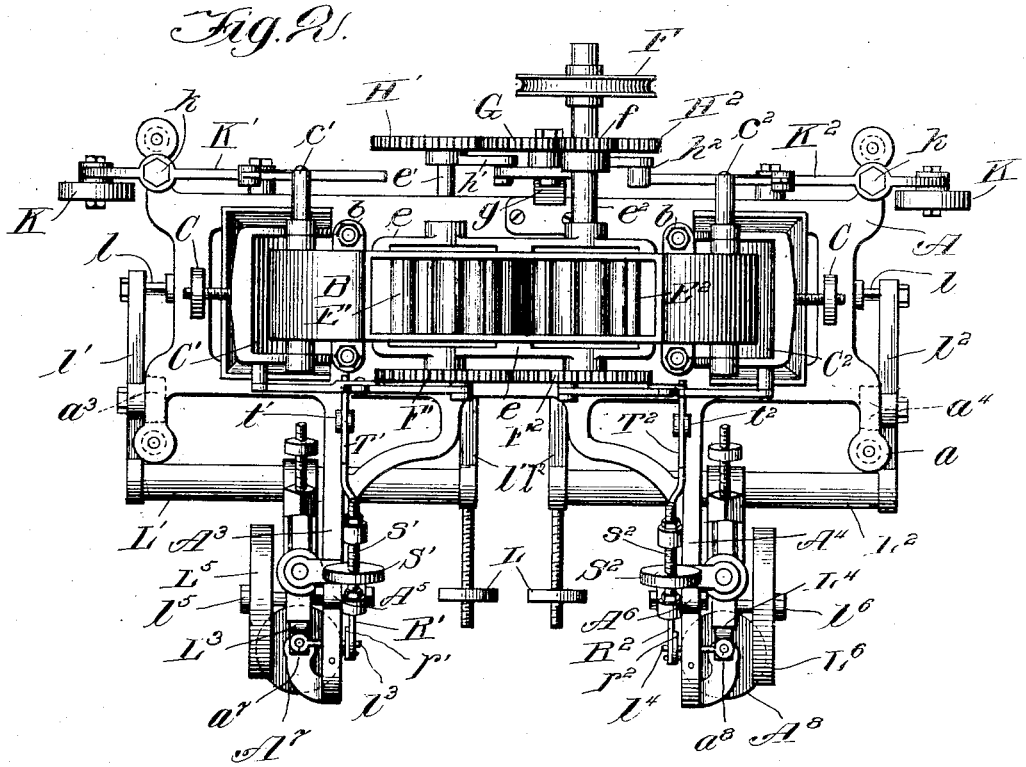
Figure 3:
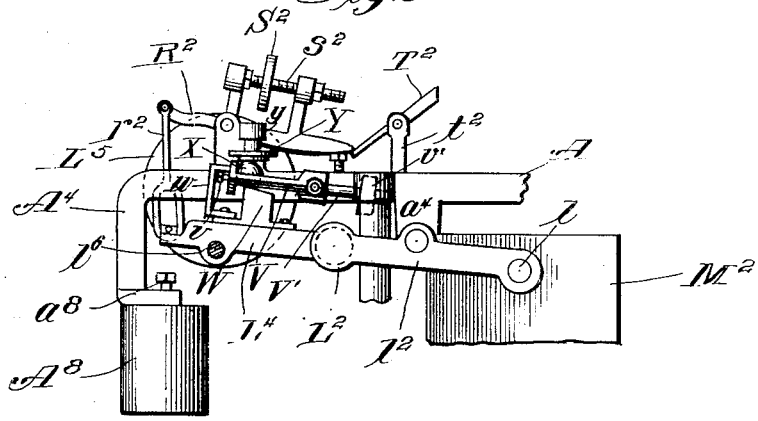

Figure 1 is an end elevational view; Fig. 2, a plan view; Fig. 3, a view similar to Fig. 1, showing the parts in an adjusted position; Fig. 4, an elevational view of one side of the machine looking from the right in Fig. 1; Fig. 5, an elevational view of the opposite side of the machine looking from the left in Fig. 1 and upwardly with respect to Fig. 2; Fig. 6, a detail view showing one of the gates held open; Fig. 7, a central vertical sectional view; and Fig. 8 a detail elevational view similar to Fig. 4, showing the mechanism in position to open one of the gates.

The same reference characters are used to designate the same parts in the several figures of the drawings.

Reference character A indicates a horizontal base or supporting-frame upon which is mounted a casing B. Any suitable means may be provided for securing the casing B to the upper surface of the base A, such, for instance, as laterally-projecting ears $b$, (see Fig. 2,) through which bolts extend.

The casing B is preferably of substantially the shape best shown in Fig. 7 and comprises an enlarged opening at the top thereof, above which is supported a hopper J, and two discharge-openings at its bottom near the ends thereof. The discharge-openings formed between the ends of the casing and the adjacent inclined portions of the bottom wall D are located above openings A' and $A^2$ through the base A. The small hoppers or funnels $a'$ and $a^2$ are mounted upon the base A and surround the openings A' and $A^2$ therethrough. Partitions $b'$ and $b^2$ are located within the casing B, thereby forming main supply-passages B' and $B^2$ between such partitions and the end walls of the casing and also forming supplemental supply-passages between such partitions and the bottom wall D of the casing. The upper ends of the partitions $b'$ and $b^2$ are bent inwardly and downwardly, as shown in Fig. 7, to form a chute leading to the supplementary passages.

Swinging gates C' and $C^2$ close the lower ends of the main supply-passages B' and $B^2$ and are provided with ears extending on either side of and pivoted to the casing B. Each of the gates is provided with a weight C, adjustably mounted upon a screw-threaded rod, the tendency of such weight being to swing the corresponding gate closed to intercept the flow of material through the corresponding main supply-passage. An adjustable stop $c$ is mounted upon the base A, upon which each weight C rests when the gate to which it is secured is closed.

Extending through the casing B are parallel shafts $e'$ and $e^2$, journaled in bearings formed in brackets $e\ e$, secured to the opposite side walls of the casing B. Fixed upon the portions of these shafts within the casing B are disks E' and $E^2$, respectively, provided with recesses in their peripheries, adjacent recesses being separated by teeth curved in the direction of rotation of the disks. The radius of each disk is such that the teeth on the periphery thereof pass in close proximity to the respective sides of a partition $d$, projecting upwardly from the bottom wall D of the casing B. The disks are also so spaced apart that the chute formed between the inturned upper ends of the partitions $b'$ and $b^2$ terminates immediately above the adjacent peripheries thereof. The corresponding ends of the shafts $e'$ and $e^2$, projecting through the bearing $e$ at one side of the casing, are provided with meshed gear-wheels F' and $F^2$, while the portion of one of such shafts—as, for instance, $e^2$—which projects through the bearing $e$ on the opposite side of the casing has fixed thereon a pinion $f$ and also a pulley F or other means for communicating rotary motion to the shaft.

In mesh with the pinion $f$ is a gear-wheel G, which is journaled upon a stub-shaft removably secured within a curved slot formed in the upper end of a bracket $g$, the latter being rigidly mounted upon the base A. The gear-wheel G is in mesh with one of two meshed gear-wheels H' and $H^2$, journaled upon stub-shafts supported by the base A. Rigidly secured to the hubs of the gear-wheels H' and $H^2$ are radial arms $h'$ and $h^2$, each of which is provided with an inwardly-projecting stud.

Pivotally mounted upon the same side of the base A are two levers K' and $K^2$, having inwardly-projecting curved ends adapted to be engaged by the respective studs on the ends of the radial arms $h'$ and $h^2$. The outer ends of each of the levers K' and $K^2$ is provided with a weight K. Pivotally supported on lugs projecting upwardly from the levers K' and $K^2$ are spring-actuated triggers $k'$ and $k^2$, which are adapted to swing outwardly—that is, toward the respective weights—against the tension of their controlling-springs, but which cannot swing inwardly from the positions shown in Fig. 4. When the levers K' and $K^2$ are oscillated through engagement with the corresponding studs on the arms $h'$ and $h^2$, the triggers $k'$ and $k^2$ are adapted to pass behind and engage studs $c'$ and $c^2$, fixed upon the gates C' and $C^2$, respectively. Each of the levers K' and $K^2$ is provided with a boss through which extends a vertical screw-threaded opening, in which is adjustably mounted screw-threaded stop $k$, adapted to project below the respective lever and engage the upper surface of the base A to limit the downward movement of the lever.

L' and $L^2$ designate scale-beams the opposite ends of which are provided with inwardly-extending parallel arms $l'\ l'$ and $l^2\ l^2$, respectively. Lugs $a^3$ and $a^4$ depend from the base A and serve as supports, to which are pivoted the inwardly-extending arms of the scale-beams. Each scale-beam is provided with an outwardly-extending screw-threaded rod upon which is adjustably mounted a secondary weight L. Each scale-beam is also provided, preferably at an intermediate point thereon, with outwardly-projecting arms $L^3$ and $L^4$, upon which are mounted the main weights $L^5$ and $L^6$, respectively, by any suitable means—such, for instance, as bolts or rods $l^5$ and $l^6$, respectively. The weights $L^5$ and $L^6$ are removable, so that they may be replaced by weights corresponding to the quantity of material which it is desired shall be weighed upon the machine.

Pivotally supported between the inner ends of the pairs of arms $l'$ $l'$ and $l^2$ $l^2$ are receptacles M' and M². The usual form of knife-edge pivot $l$ is interposed between each arm and the adjacent end of the corresponding weighing-receptacle, as indicated in Fig. 2. Each of the weighing-receptacles M' and M² is provided with a central partition $m$, above which is pivotally mounted a guide to direct the material into one or the other of the compartments of the respective receptacles. Such guides are shown in Fig. 7 at $m'$ and $m^2$, and each consists in two trough-shaped portions arranged back to back and rigidly secured to rods $m^3$ and $m^4$, the latter extending through and being journaled in the walls of the receptacles. Fixed upon the corresponding ends of the rods $m^3$ and $m^4$, which project through the weighing-receptacles, are short levers M³ and M⁴, to the opposite ends of which are pivotally connected pairs of links $n'$ and $n^2$. The lower ends of each pair of links are pivotally connected to either side of the fulcrum of an oscillating bottom of the corresponding receptacle. Such bottoms are designated by N' and N² and are pivotally mounted upon the rods $n^3$ and $n^4$, which are supported at their opposite ends by ears depending from the side walls of the receptacles. The oscillating bottoms are of such shape that when in one position one compartment of the corresponding receptacle will be closed, while the other compartment will be opened, and through the interposed pair of links the guide at the top of the receptacle will be correspondingly oscillated to guide the material into the compartment which is closed at its bottom.

Located below the weighing-receptacles is a frame P, which may be conveniently supported by means of posts P', depending from the corner-bosses $a$ of the base A, the frame P being provided with a laterally-projecting flange having corner-bosses $p$, which are rigidly secured to the lower end of the posts in any suitable manner. The frame P consists in side and end walls, preferably slightly tapered inwardly, to the lower edges of which are secured the upper end of a funnel P², into which the measured material is discharged from the compartments of the weighing-receptacles. $p'$ indicates a transverse partition extending between the side walls of the lower frame P.

Each of the weighing-receptacles M' and M² has pivoted on the exterior of one end thereof a latch O, provided with a downwardly-extending lug $o$, adapted to engage one of the notches $n$, formed in the upper edge of a bracket N, rigidly secured to the oscillating bottoms of the receptacle. The bracket N is preferably bifurcated at its lower end and connected at either side of the fulcrum-point of the corresponding bottom N' or N². Two notches $n$ are provided in the bracket N, which are alternately engaged by the lug on the latch O and retain the bottom of the receptacle in either position to which it may have been oscillated. Rigidly secured to the top flange of the frame P are tripping-fingers O' O', one of such fingers being located substantially in alinement with the interior partition $m$ in each of the weighing-receptacles. Each tripping-finger is provided with an inwardly-projecting end $o'$, which extends beneath the inner or free end of the corresponding latch O, so that upon each receptacle being sufficiently depressed by the weight of the material therein the inturned end of the tripping-finger will be engaged by the inner end of the latch O and the lug $o$ on the latch thereby lifted out of the engaged notch on the bracket N, permitting the weight of the material to oscillate the bottom of the receptacle in position to discharge the material from one compartment and close the other compartment.

Projecting horizontally from one side of the base A are arms A³ and A⁴, which are provided with downwardly-extending end portions, to which are rigidly secured weights A⁷ and A⁸. Such weights are for the purpose of giving stability to the apparatus and prevent the undue vibrations during the operations thereof, which would otherwise be caused by the filling and discharging of the receptacles with the material which is being weighed. Mounted above the weights A⁷ and A⁸ and adjustably secured to the ends of the arms A³ and A⁴ are stops $a^7$ and $a^8$, upon which the ends of the arms L³ and L⁴ of the respective scale-beams rest after the respective receptacles supported by the scale-beams have been discharged.

Lugs A⁵ and A⁶ project upwardly from and are preferably formed integral with the arms A³ and A⁴. Levers R' and R² are fulcrumed upon the lugs A⁵ and A⁶ at points intermediate of their ends. From the outer ends of such levers depend links $r'$ and $r^2$, the lower ends of which are provided with loops, into which extend rods $l^3$ and $l^4$, respectively, which are fixed to the outer ends of the arms L³ and L⁴ of the scale-beams. Screw-threaded rods $s'$ and $s^2$ are supported in brackets extending upwardly from the levers R' and R². Weights S' and S² are adjustably mounted upon the respective screw-threaded rods $s'$ and $s^2$. The brackets which support the screw-threaded rods extend upwardly from portions of the levers R' and R² intermediate of their fulcrums and their inner ends.

T' and T² designate tripping devices pivotally supported at points intermediate of their ends upon brackets $t'$ and $t^2$, fixed upon the supporting-frame A. The inner ends of the tripping devices extend beneath the joints of pairs of links U' and U². Each pair of such links is pivoted at one end to one of the gates C' and C² and at its other end to a bracket $u'$ or $u^2$, fixed upon the supporting-base A. The connected ends of the links in each pair are provided with pin-and-slot unions and are also provided with shoulders, so that when the links of each pair are extended in alinement they form a knee-joint to retain the corresponding gate open in the position shown in Fig. 6.

Pivotally mounted upon the outer side of each of the arms $A^3$ and $A^4$ is an oscillating guide V, having a raceway in which is located a ball or other gravity device X. A rod V' projects from the guide V in an opposite direction from its fulcrum to that of the raceway and has adjustably mounted thereon a weight $v'$. Projecting from the outer end of the raceway is a stud or screw $v$, which extends beneath the inturned upper end of a bracket $w$, the lower end of which is rigidly secured to the upper surface of the arm of the corresponding scale-beam. An inclined lug W is fixed upon the upper surface of each scale-arm in alinement with the raceway in the guide V. Located in alinement above the lug W is a stop Y, which depends from and is adjustably supported by a lug $y$, projecting laterally from the bracket $A^6$ upon the arm $A^4$.

The operation of my invention is as follows: The material to be weighed is deposited in the hopper J and flows therefrom into each of the main passages B' and $B^2$ and also through the chute between the inturned ends of the partitions $b'$ and $b^2$ into contact with the inner peripheries of the disk E' and $E^2$. Rotary motion is imparted to the shaft $e^2$ by any suitable power connection—such, for instance, as a belt engaging the pulley F. The rotary motion imparted to the shaft $e^2$ is transmitted to the shaft $e'$ by means of the meshed gear-wheels F' and $F^2$ and is also transmitted to the meshed gear-wheels H' and $H^2$ through the gear-wheel G, interposed between the pinion $f$ on the shaft $e^2$ and the gear-wheel $H^2$. The rotation of the gear-wheel $H^2$ carries with it the radial arm $h^2$ and the stud on the end thereof, which latter engages the inner end of the lever $K^2$ and forces the same downwardly, thereby lifting the weight K on the opposite end of the lever. Such oscillation of the lever $K^2$ swings the trigger $k^2$ back of the stud $c^2$ on the gate $C^2$, as shown in Fig. 8. When the stud on the arm $h^2$ passes out of engagement with the inner end of the lever $K^2$, the weight K instantly swings the lever back to the position shown in Fig. 4 and through the engagement of the trigger $k^2$ with the stud $c^2$ opens the gate $C^2$, the latter being retained open by the links $U^2$ assuming an alined position, such as shown in Fig. 6. The material then passes through the main supply-passage $B^2$ into a compartment of the weighing-receptacle $M^2$, the material being guided into such receptacle by the guide $m^2$, as clearly indicated in Fig. 7. Upon sufficient material accumulating in the compartment of the receptacle $M^2$ to overbalance the weight $L^6$ on the scale-beam $L^2$, the latter is swung into the position shown in Fig. 3, in which the downward movement of the receptacle has been limited by the inclined lug W on the scale-beam arm $L^4$, gripping the gravity-ball X against the stop Y. In such position the lowering of the weighing-receptacle has not been sufficient for the tripping-finger O' to elevate the latch O out of engagement with the notch in the bracket N on the oscillating bottom of the receptacle. The gravity-ball X only remains in position to prevent the further downward movement of the weighing-receptacle long enough to prevent the downward momentum of such receptacle lowering the same sufficiently to trip the bottom thereof and discharge the material, whereupon the ball rolls from between the inclined lug W and the stop Y and permits the gradual lowering of the receptacle as the material is supplied thereto by the constantly-rotating feeding-disk $E^2$ until the predetermined amount of material has accumulated in the compartment of the receptacle, lowering the latter sufficiently far to cause the tripping-finger O' to disengage the latch O and permit the weighed material to swing the oscillating bottom $N^2$ into position to open the compartment which has received the material, thereby discharging the same through the frame P and funnel $P^2$.

The lowering of the receptacle from the position shown in Fig. 1 to that shown in Fig. 3 is due not only to the material delivered thereto, but also to the weight $S^2$, which lifts upwardly upon the outer end of the arm $L^4$ of the scale-beam $L^2$, through the link $r^2$, the loop at the lower end of which surrounds the rod $l^4$, fixed to the lever on the scale-beam. The amount of material supplied to the receptacle prior to its lowering into the position shown in Fig. 3 is therefore less than the predetermined amount to be weighed by a quantity corresponding to the weight $S^2$. When the receptacle settles to the position shown in Fig. 3, the lever $R^2$ has swung to such a position that its free end has engaged the adjacent end of the tripping device $T^2$ and oscillated the latter, so as to break the knee-joint of the links $U^2$, thereby permitting the gate $C^2$ to be instantly closed by the weight C, carried thereby. The delivery of the material to the weighing-receptacle after the parts have assumed the position shown in Fig. 3 is consequently due entirely to the constantly-rotating disk $E^2$, which completes the predetermined amount of material in the receptacle, causing the same to lower the necessary degree to trip the bottom thereof. The ball X is retained out of the path of the lug W after the parts have assumed the position shown in Fig. 3, by reason of the weight $v'$, which oscillates the raceway $v$ to such an inclined position that the gravity-ball X rests at the end of the raceway adjacent to the fulcrum thereof. Upon the receptacle being lowered sufficiently to cause the latch O to be tripped by the finger O' the bottom of the receptacle is swung by the weight of the material within the filled compartment into such a position that the other compartment of the receptacle is closed and the same retained closed by the engagement of the lug on the latch O with the notch at the other edge of the bracket N on the tilting bottom. The tilting of the bottom of the receptacle through the interposed pair of links $n^2$ oscillates the guide $m^2$ about its pivotal rod $m^4$, so that the material flowing from the disk $E^2$ is at once diverted into the empty compartment of the receptacle. The discharge of the material from the receptacle permits the weight $L^6$ to at once elevate the receptacle and bring the outer end of the scale-arm $L^4$ into contact with the adjustable stop $a^8$. The lowering of the scale-arm oscillates the raceway through the bracket $w$ back to the position shown in Fig. 1 and through the engagement of the rod $l^4$ with the link $r^2$ oscillates the lever $R^2$ to the position shown in Fig. 1, and thereby elevates its free end above the tripping device $T^2$. After the gear-wheels H' and $H^2$ have been oscillated through one hundred and eighty degrees from the position shown in Fig. 4 the boss on the arm $h'$ engages the inner end of the lever K' and oscillates the same, so that the weight K on the end thereof is elevated and the trigger $k'$ engaged behind the stud $c'$ on the gate C' in position to open such gate upon the stud on the arm $h'$ passing out of contact with the inner end of the lever K'. The material is consequently delivered to one of the compartments of the weighing-receptacle M' through the main delivery-supply B' until the partial lowering of such receptacle has oscillated the scale-beam and permitted the supplementary weight S' to oscillate the lever R' and break the knee-joint of the links U', permitting the gate C' to close. The complete lowering of the receptacle is interrupted by mechanism similar to that above described in connection with the operation of the weighing-receptacle $M^2$, and the completion of the predetermined amount in the receptacle is effected by the continuous feed due to the constant rotation of the disk E'. Upon the predetermined amount of material being completed the receptacle is lowered, so as to discharge the weighed material from the compartment and close the adjoining compartment into which the material flowing from the disk is directed by the position of the guide $m'$.

It will be noticed that the respective supplementary weights S' and $S^2$ merely aid the material in the receptacles in oscillating the scale-beams until they assume the positions shown in Fig. 3, at which time the levers R' and $R^2$ come to a rest upon stops upon the arms $A^3$ and $A^4$ of the frame, and the further oscillation of the scale-beam is due entirely to the material delivered to the receptacle as the continued upward movement of the outer end of the arm $L^3$ or $L^4$ merely lifts the rod $l^3$ or $l^4$ upwardly within the loop at the lower end of the link $r'$ or $r^2$.

From the foregoing description it will be observed that the material to be weighed is alternately supplied to two receptacles and delivered alternately into the two compartments of each receptacle. Consequently the capacity of the machine is greatly multiplied, especially as the completing feeding devices, consisting in the disks E' and $E^2$, constantly deliver material into one compartment or the other of both receptacles. The rapidity of operation is dependent upon the speed of rotation of the meshed gear-wheels H' and $H^2$, which carry the arms having studs on their ends, which, through the coöperating levers K' and $K^2$ and the triggers thereon, effect the alternate opening of the gates C' and $C^2$. The speed of rotation of such gear-wheels with relation to the speed of rotation of the power-driven shaft $e^2$ may be varied by varying the size of the pinion or small gear-wheel $f$, which is permitted by reason of the adjustable bearing of the gear-wheel G', interposed between such pinion and the gear-wheel $H^2$. It is obvious, however, that the gear-wheels H' and $H^2$ should not complete a revolution until the predetermined quantity of material has been weighed and discharged from the corresponding receptacles, and therefore the proportion of the predetermined amount of material supplied to the receptacles by the secondary or completing feeding devices must only be such as to permit the predetermined amounts being delivered to the receptacles during the time required for the rotation of the gear-wheels H' and $H^2$. The amount of material which is to be supplied by the supplementary or completing devices is determined by the respective supplementary weights S' and $S^2$. When they are adjusted upon their supporting screw-threaded rods $s'$ and $s^2$ away from the fulcrums of the levers R' and $R^2$, the receptacles will be lowered to the positions shown in Fig. 3 and the controlling-gates closed after a less supply of material has passed than would be supplied through such passages were the positions of such weights nearer the fulcrums of the levers R' and $R^2$. In other words, the adjustment of the weights S' and $S^2$ determines the proportion of material which is to be supplied by the completing feeding devices after the gates have closed the main supply. It will be further observed that by adjusting the stops $a^7$ and $a^8$, which limit the downward movement of the outer ends of the levers $L^3$ and $L^4$ of the respective scale-beams, the proportions of the material delivered to the compartments of the receptacles by the main supply and completing supply may also be varied. For instance, when the stops are adjusted upwardly the weights S' and S² occupy positions farther from the center of gravity of the fulcrums of the levers R' and R², and hence exert more power to aid the material in the receptacles in swinging the coöperating parts to the positions shown in Fig. 3, and consequently increase the amount of the material supplied by the completing feeders.

From the foregoing description it will be observed that I have invented an improved power-controlled automatic weighing-machine in which the rapidity of action of the machine is not due to the material being weighed, which would cause the action of the machine to vary according to the condition of such material, but is due to power-driven parts operating positively at predetermined intervals. It will be further observed that I have invented a weighing-machine which may be readily adjusted to suit the nature of the material which is to be weighed and to effect the greatest rapidity of action commensurate with the character of the material.

While I have described more or less precisely the details of construction, I do not wish to be understood as limiting myself thereto, as I contemplate changes in form, the proportion of parts, and the substitution of equivalents, as circumstances may suggest or render expedient, without departing from the spirit of my invention.

Having now fully described my invention, what I claim as new, and desire to secure by Letters Patent, is—

1. In a weighing-machine, the combination with a plurality of weighing-receptacles, each having two compartments, of a separate main supply for delivering material to each of said receptacles, a separate gate for discontinuing said main supply to each receptacle, a separate continuous supplemental supply for delivering material to each receptacle after the discontinuance of said main supply, deflectors for directing the material alternately into the compartments of each receptacle, and means for discharging a predetermined quantity of material from said receptacles.

2. In a weighing-machine, the combination with a plurality of weighing-receptacles each having two compartments, of channels for supplying material alternately to the receptacle and alternately to the compartments of each receptacle, deflectors for directing the material alternately into the compartments of each receptacle and mechanism for separately discharging a predetermined quantity of material from the compartments.

3. In a power-controlled automatic weighing-machine, the combination with a plurality of weighing-receptacles, each having two compartments, of a separate main supply for delivering material to each receptacle, a separate gate for discontinuing said main supply, separate power-actuated means for delivering a continuous supplemental supply of material to each receptacle after the discontinuance of said main supply, deflectors for directing the material alternately into the compartments of each receptacle, and means for discharging a predetermined quantity of material from said receptacles.

4. In a weighing-machine, the combination with a plurality of weighing-receptacles each having two compartments, of a plurality of channels for supplying material alternately to the receptacles and alternately to the compartments of each receptacle, deflectors for directing the material alternately into the compartments of each receptacle and mechanism actuated by the sinking of the receptacles for separately discharging a predetermined quantity of the material from the compartments.

5. In a weighing-machine, the combination with a plurality of weighing-receptacles, of a plurality of channels for supplying material to said receptacles, the channels for each receptacle being separate and distinct from those leading to the other receptacle a gate controlling the passage of material through one of the channels leading to each receptacle, mechanism for closing said gates to cut off the supply of material to the receptacles means for delivering a continuous completing supply of material to said receptacles after the closing of the gates and mechanism for successively reopening said gates.

6. In a weighing-machine, the combination with a plurality of weighing-receptacles, of a plurality of channels for supplying material to said receptacles, the channels for each receptacle being separate and distinct from those leading to the other receptacle a gate controlling the passage of material through one of the channels leading to each receptacle, mechanism for closing said gates to cut off the supply of material to the receptacles, means for delivering a continuous completing supply of material to said receptacles after the closing of the gates mechanism for successively reopening said gates, and means for successively discharging predetermined quantities of material from the receptacles.

7. In a weighing-machine, the combination with a plurality of weighing-receptacles, of a plurality of channels for supplying material to said receptacles, the channels for each receptacle being separate and distinct from those leading to the other receptacle a gate controlling the passage of material through one of the channels leading to each receptacle, mechanism actuated by the sinking of the respective receptacles for closing said gates to cut off the supply of material to the receptacles, means for delivering a continuous completing supply of material to said receptacles after the closing of the gates and mechanism for successively reopening said gates.

8. In a weighing-machine, the combination with a plurality of weighing-receptacles, of a channel for supplying material to each of said receptacles, gates controlling the passage of material through said channels, mechanism for closing said gates to cut off the supply of material to the receptacles, power-actuated supplemental means for continuing the supply of material to the receptacles after the gates are closed, and mechanism for successively reopening said gates.

9. In a weighing-machine, the combination with a plurality of weighing-receptacles, of a channel for supplying material to each of said receptacles, gates controlling the passage of material through said channels, mechanism actuated by the sinking of the respective receptacles for closing said gates to cut off the supply of material to the receptacles, means for successively discharging predetermined quantities of the material from the receptacles, supplemental means for delivering a continuous completing supply of the material to the receptacles after the gates are closed, and mechanism for successively reopening said gates.

10. In a weighing-machine, the combination with a plurality of weighing-receptacles, of a channel for supplying material to each of said receptacles, gates controlling the passage of material through said channels, mechanism for closing said gates to cut off the supply of material to the receptacles, supplemental uninterrupted channels through which material is continuously supplied to said receptacles after the gates are closed, and mechanism for successively reopening said gates.

11. In a weighing-machine, the combination with a plurality of weighing-receptacles, of a channel for supplying material to each of said receptacles, gates controlling the passage of material through said channels, mechanism for successively opening said gates, pairs of links for retaining said gates open, and mechanism for breaking the knee-joints in the pairs of links to permit the gates to close.

12. In a weighing-machine, the combination with a plurality of weighing-receptacles, of a channel for supplying material to each of said receptacles, gates controlling the passage of material through said channels, mechanism for successively opening said gates, pairs of links for retaining said gates open, and mechanism actuated by the sinking of the receptacles for breaking the knee-joints in the pairs of links to permit the gates to close.

13. In a weighing-machine, the combination with a plurality of weighing-receptacles, of a channel for supplying material to each of said receptacles, gates controlling the passage of material through said channels, mechanism for successively opening said gates, pairs of links for retaining said gates open, mechanism for breaking the knee-joints in the pairs of links to permit the gates to close, and supplemental means for continuing the supply of material to the receptacles after the gates are closed.

14. In a weighing-machine, the combination with a plurality of weighing-receptacles, of a channel for supplying material to each of said receptacles, gates controlling the passage of material through said channels, mechanism for successively opening said gates, pairs of links for retaining said gates open, mechanism for breaking the knee-joints in the pairs of links to permit the gates to close, and mechanism for successively discharging predetermined quantities of the material from the respective receptacles.

15. In a power-controlled automatic weighing-machine, the combination with a plurality of weighing-receptacles, of a channel for supplying material to each of said receptacles, gates controlling the passage of material through said channels, mechanism for closing said gates, and power-actuated mechanism for successively opening said gates at predetermined intervals.

16. In a power-controlled automatic weighing-machine, the combination with a plurality of weighing-receptacles, of a channel for supplying material to each of said receptacles, gates controlling the passage of material through said channels, mechanism for closing said gates, power-actuated supplemental means for continuing the supply of the material to the receptacles after the gates are closed, and power-actuated mechanism for successively opening said gates at predetermined intervals.

17. In a power-controlled automatic weighing-machine, the combination with a plurality of weighing-receptacles, of a channel supplying material to each of said receptacles, gates controlling the passage of material through said channels, power-actuated mechanism for successively opening said gates at predetermined intervals, pairs of links for retaining said gates open, and mechanism for breaking the knee-joints in the pairs of links to permit the gates to close.

18. In a power-controlled automatic weighing-machine, the combination with a plurality of weighing-receptacles, of a channel for supplying material to each of said receptacles, gates controlling the passage of material through said channels, power-actuated mechanism for successively opening said gates at predetermined intervals, pairs of links for retaining said gates open, mechanism for breaking the knee-joints in the pairs of links to permit the gates to close, and power-actuated supplemental means for continuing the supply of material to the receptacles after the gates are closed.

19. In a weighing-machine, the combination with a plurality of weighing-receptacles each having two compartments, of a plurality of channels for supplying material alternately to the compartments of each receptacle, a gate controlling the passage of material through a channel leading to each receptacle, mechanism for closing said gates, means for successively discharging predetermined quantities of material from said compartments, and mechanism for successively reopening said gates.

20. In a power-controlled automatic weighing-machine, the combination with a plurality of weighing-receptacles each having two compartments, of channels for supplying material alternately to the compartments of each receptacle, a gate controlling a channel leading to each receptacle, mechanism for closing said gates, power-actuated supplemental means for continuing the supply of material to the compartments after the gates are closed, and power-actuated mechanism for successively opening said gates at predetermined intervals.

21. In a weighing-machine the combination with a plurality of weighing-receptacles each having two compartments, of a plurality of channels for supplying material alternately to the receptacles and alternately to the compartments of each receptacle, deflectors for directing the material alternately into the compartments of each receptacle, oscillating bottoms for said receptacles adapted to close one and simultaneously open the other compartment, and means actuated by the sinking of the receptacles to oscillate said bottoms to open one compartment and close the other compartment.

22. In a weighing-machine, the combination with a plurality of weighing-receptacles each having two compartments, of a plurality of channels for supplying material alternately to the receptacles and alternately to the compartments of each receptacle, deflectors for directing the material alternately into the compartments of each receptacle, oscillating bottoms for said receptacles adapted to close one and simultaneously open the other compartment, means actuated by the sinking of the receptacles to oscillate said bottoms to open one compartment and close the other compartment, swinging guides located above the compartments in each receptacle, and operative connections between the guide and bottom of each receptacle for swinging said guide into position to direct the material into the closed compartment.

23. In a power-controlled automatic weighing-machine, the combination with a weighing-receptacle having two compartments, of a channel for supplying material to said receptacle, a gate controlling said channel, power-actuated mechanism for opening said gate at predetermined intervals, mechanism for closing said gate actuated by the partial sinking of the receptacle, a supplemental channel for continuing the supply of material to the receptacle after the gate is closed, and means actuated by the further sinking of the receptacle for discharging a predetermined quantity of the material.

24. In a power-controlled automatic weighing-machine, the combination with a weighing-receptacle having two compartments, of a channel for supplying material to said receptacle, a gate controlling said channel, power-actuated mechanism for opening said gate at predetermined intervals, mechanism for closing said gate actuated by the partial sinking of the receptacle, a supplemental channel, power-actuated means for continuing the supply of material through said supplemental channel to the receptacle after the gate is closed, and means actuated by the further sinking of the receptacle for discharging a predetermined quantity of the material.

25. In a power-controlled automatic weighing-machine, the combination with a weighing-receptacle having two compartments, of a channel for supplying material to said receptacle, a gate controlling said channel, a lever adapted to engage and open said gate, power connections for actuating said lever at predetermined intervals, mechanism for closing said gate actuated by the partial sinking of the receptacle, and supplemental means for continuing the supply of the material to the receptacle after the gate is closed.

26. In a power-controlled automatic weighing-machine, the combination with a weighing-receptacle, of a channel for supplying material to said receptacle, a gate controlling said channel, a weighted lever, power connections intermittently engaging said lever for oscillating the same into position to engage said gate whereby when the lever is released by the power connections the weight thereon will swing the same to its normal position thereby opening the gate, mechanism for retaining the gate open, and mechanism for closing said gate actuated by the sinking of the receptacle.

27. In a power-controlled automatic weighing-machine, the combination with a weighing-receptacle, of a channel for supplying material to said receptacle, a gate controlling said channel, a weight tending to normally close said gate, a weighted lever, power connections intermittently oscillating said lever into position to engage said gate whereby when the lever is released by the power connection the weight thereon will swing the same to its normal position thereby opening the gate, a pair of links for retaining said gate open, and means for breaking the knee-joints of said links to permit the weight on the gate to swing the same closed.

28. In a power-controlled automatic weighing-machine, the combination with a weighing-receptacle, of a channel for supplying material to said receptacle, a gate controlling said channel, a shaft having a radial arm thereon, power connections for rotating said shaft, a weighted lever adapted to be engaged by said arm and oscillated into position to engage said gate whereby when said arm passes out of contact with said lever the weight thereon will swing the same to its normal position thereby opening said gate, means for retaining the gate open, and means actuated by the sinking of the receptacle for permitting said gate to close.

29. In a power-controlled automatic weighing-machine, the combination with a weighing-receptacle having two compartments, of a channel for supplying material to said receptacle, a gate controlling said channel, mechanism for opening said gate at predetermined intervals, mechanism for closing said gate actuated by the sinking of the receptacle, a supplemental uninterrupted channel, a power-actuated feeding device for delivering material into said channel and thereby completing the predetermined amount of material in said receptacle after the closing of said gate.

30. In a power-controlled automatic weighing-machine, the combination with a weighing-receptacle having two compartments, of a channel for supplying material to said receptacle, a gate controlling said channel, mechanism for opening said gate at predetermined intervals, mechanism for closing said gate actuated by the sinking of the receptacle, a supplemental uninterrupted channel, a rotary disk having recesses in its periphery for receiving material and delivering the same into said supplemental channel, power connections for continuously rotating said disk whereby the predetermined amount of material is supplied to said receptacle after the closing of said gate.

31. In a power-controlled automatic weighing-machine, the combination with a weighing-receptacle having two compartments, of a channel for supplying material to said receptacle, a gate controlling said channel, a weighted lever, power connections intermittently oscillating said lever into position to engage said gate whereby when the lever is released by the power connections the weight thereon will swing the same to its normal position thereby opening said gate, means for closing said gate upon the partial sinking of said receptacle, a supplemental uninterrupted channel leading to said receptacle, a power-actuated feeding device for delivering material into said channel thereby completing the predetermined amount of material in said receptacle after the closing of said gate.

32. In a power-controlled automatic weighing-machine, the combination with a weighing-receptacle having two compartments, of a channel for supplying material to said receptacle, a gate controlling said channel, a shaft having a radial arm thereon, means for rotating said shaft, a weighted lever adapted to be engaged by said arm and oscillated into position to engage said gate whereby when said arm passes out of contact with said lever the weight thereon will swing the same to its normal position and thereby open said gate, mechanism for closing said gate actuated by the partial sinking of the receptacle, a supplemental uninterrupted channel leading to said receptacle, a rotary disk having recesses in its periphery for receiving the material and delivering the same into said supplemental channel, power connections for rotating said disk, and means actuated by the further sinking of the receptacle for discharging a predetermined quantity of the material therefrom.

33. In a power-controlled automatic weighing-machine, the combination with a weighing-receptacle, of a scale-beam supporting said receptacle and having an arm for supporting the counterbalance-weight, a channel for supplying material to said receptacle, a gate controlling said channel, means for closing said gate upon the partial sinking of said receptacle, supplemental means for continuing the supply of material to the receptacle after the closing of said gate, a supplemental counterweight flexibly connected to said scale-beam arm to assist said material to lower the receptacle sufficiently to close said gate thereby determining the amount of material supplied by said supplemental means after the closing of said gate.

34. In a weighing-machine, the combination with a weighing-receptacle having two compartments, of a main supply for delivering material to said receptacle, means for discontinuing said main supply, a continuous supplemental supply for delivering material to said receptacle after the discontinuance of said main supply, and means for discharging a predetermined quantity of material from said receptacle.

In testimony whereof I sign this specification in the presence of two witnesses.

GEORGE HOEPNER.

Witnesses:
  GEO. L. WILKINSON,
  C. C. CUNNINGHAM.